United States Patent
Nair et al.

(10) Patent No.: US 12,314,675 B2
(45) Date of Patent: May 27, 2025

(54) SYSTEM AND METHOD FOR A COGNITIVE CONVERSATION SERVICE

(71) Applicant: WALDEN UNIVERSITY, LLC, Columbia, MD (US)

(72) Inventors: Sreevishnu Somasekharan Nair, Frisco, TX (US); Karthik Venkatesh, Frisco, TX (US)

(73) Assignee: WALDEN UNIVERSITY, LLC, Columbia, MD (US)

(*) Notice: Subject to any disclaimer, the term of this patent is extended or adjusted under 35 U.S.C. 154(b) by 174 days.

(21) Appl. No.: 17/741,423

(22) Filed: May 10, 2022

(65) Prior Publication Data

US 2022/0358295 A1 Nov. 10, 2022

Related U.S. Application Data

(60) Provisional application No. 63/186,422, filed on May 10, 2021.

(51) Int. Cl.
| | |
|---|---|
| G06F 40/35 | (2020.01) |
| G06F 16/353 | (2025.01) |
| G06N 5/04 | (2023.01) |
| H04L 51/02 | (2022.01) |

(52) U.S. Cl.
CPC ............ *G06F 40/35* (2020.01); *G06F 16/353* (2019.01); *G06N 5/04* (2013.01); *H04L 51/02* (2013.01)

(58) Field of Classification Search
CPC .... G06F 40/35; G06F 16/353; G06F 16/3329; G06F 40/30; G06N 5/04; G06N 3/042; G06N 3/045; G06N 5/02; H04L 51/02
USPC ............................................................ 704/9
See application file for complete search history.

(56) References Cited

U.S. PATENT DOCUMENTS

| | | | | |
|---|---|---|---|---|
| 6,731,307 | B1* | 5/2004 | Strubbe | H04N 21/466 |
| | | | | 715/764 |
| 7,302,383 | B2* | 11/2007 | Valles | G06F 40/30 |
| | | | | 704/231 |
| 8,645,122 | B1* | 2/2014 | Di Fabbrizio | G06F 40/237 |
| | | | | 704/251 |

(Continued)

OTHER PUBLICATIONS

Brown et al. "Language models are few-shot learners." arXiv:2005.14165v4 [cs.CL] (Jul. 22, 2020).

(Continued)

*Primary Examiner* — Thuykhanh Le
(74) *Attorney, Agent, or Firm* — Heidi Eisenhut; LOZA & LOZA, LLP

(57) ABSTRACT

Aspects of the present disclosure are related to systems, apparatus, and methods for training a chatbot, such that a user can ask a question and the bot can provide the answer using natural conversation. The solution disclosed herein creates a conversation engine that can be trained automatically by feeding in articles, FAQs, or documents on specific topics. The conversation engine can provide answers to user's questions on the trained topic through a natural conversation. The conversation engine can provide web service endpoints for training the engine on specific topics, and which can also be used during conversation with the user on that topic. When users ask a question on a topic to the chatbot, the chatbot can invoke conversation service endpoints, together with the intents, and the conversation service can provide the response via the chatbot.

15 Claims, 5 Drawing Sheets

(56) References Cited

U.S. PATENT DOCUMENTS

| | | | |
|---|---|---|---|
| 9,892,723 B2* | 2/2018 | Korbecki | G10L 13/00 |
| 10,771,408 B2 | 9/2020 | Lim et al. | |
| 11,037,549 B1* | 6/2021 | Kulkarni | G10L 15/1815 |
| 11,138,463 B1* | 10/2021 | Wang | G06N 5/047 |
| 11,184,306 B1* | 11/2021 | Angeli | H04L 51/214 |
| 11,626,107 B1* | 4/2023 | Hajebi | G06F 40/295 |
| | | | 704/235 |
| 2012/0253825 A1* | 10/2012 | Di Fabbrizio | G06F 40/58 |
| | | | 704/E21.001 |
| 2016/0055240 A1* | 2/2016 | Tur | G06F 40/284 |
| | | | 707/706 |
| 2018/0329982 A1* | 11/2018 | Patel | G06F 16/3322 |
| 2018/0336415 A1* | 11/2018 | Anorga | G06N 20/00 |
| 2019/0050494 A1* | 2/2019 | Rao | G06F 16/435 |
| 2019/0138267 A1* | 5/2019 | Mailey | G06F 3/04817 |
| 2019/0294673 A1* | 9/2019 | Sapugay | G06F 40/295 |
| 2019/0294676 A1* | 9/2019 | Sapugay | G10L 15/19 |
| 2019/0325068 A1* | 10/2019 | Lai | G06F 16/951 |
| 2019/0348028 A1* | 11/2019 | Skobeltsyn | G10L 15/26 |
| 2020/0097820 A1* | 3/2020 | Song | G06N 3/08 |
| 2020/0193160 A1* | 6/2020 | Lee | G06F 40/30 |
| 2020/0274970 A1* | 8/2020 | Ding | G06N 20/00 |
| 2020/0286402 A1* | 9/2020 | He | G06N 3/08 |
| 2020/0335095 A1* | 10/2020 | Yuan | G10L 15/1815 |
| 2020/0364511 A1* | 11/2020 | Brown | G06F 16/3329 |
| 2020/0410505 A1* | 12/2020 | Jones | G06F 40/30 |
| 2021/0004691 A1* | 1/2021 | Neumann | G06N 5/041 |
| 2021/0012222 A1* | 1/2021 | Kim | G06F 40/30 |
| 2021/0065685 A1* | 3/2021 | Hwang | G10L 15/063 |
| 2021/0073239 A1* | 3/2021 | Klimuk | G06N 3/08 |
| 2021/0117868 A1* | 4/2021 | Sriharsha | G06N 20/20 |
| 2021/0150385 A1* | 5/2021 | Mallette | G06F 16/3329 |
| 2021/0350346 A1* | 11/2021 | Edwards | G06Q 20/1085 |
| 2021/0390259 A1* | 12/2021 | Hildick-Smith | G06F 40/30 |
| 2022/0075793 A1* | 3/2022 | Jezewski | G06N 5/04 |
| 2022/0124056 A1* | 4/2022 | Cress | G06F 18/22 |
| 2022/0156298 A1* | 5/2022 | Mahmoud | G06F 16/9535 |
| 2022/0229994 A1* | 7/2022 | Sharma | H04L 51/18 |
| 2022/0238103 A1* | 7/2022 | Madhusudhan | G10L 15/1815 |
| 2022/0245134 A1* | 8/2022 | Aalipour Hafshejani | |
| | | | G06F 16/243 |
| 2022/0245340 A1* | 8/2022 | Yang | G06F 40/279 |
| 2022/0277186 A1* | 9/2022 | Tran | G06N 3/042 |

OTHER PUBLICATIONS

Joshi et al. "SpanBERT: Improving pre-training by representing and predicting spans." arXiv:1907.10529v3 [cs.CL] (Jan. 18, 2020).

Miller et al. "ParlAI A dialog research software platform." arXiv:1705.06476v4 [cs.CL] (Mar. 8, 2018).

Riemers et al. "Sentene-BERT: Sentence embeddings using Siamese BERT-networks." arXiv:1908.10084v1 [cs.CL] Aug. 27, 2019).

* cited by examiner

SYSTEM AND METHOD FOR A COGNITIVE CONVERSATION SERVICE

PRIORITY CLAIM

This application claims priority to and the benefit of provisional patent application number 63/186,422, filed in the United States Patent and Trademark Office on May 10, 2021, the entire content of which is incorporated herein by reference as if fully set forth below in its entirety and for all applicable purposes.

TECHNICAL FIELD

The present disclosure relates to a cognitive tutor, and more specifically to automating the training of a conversation engine that can empower a chatbot to have a natural conversation with an individual regarding topics not previously trained.

BACKGROUND

A chatbot represents an automated approach, which combines the power of a search engine with the intuition and knowledge of a library assistant. However, the classic training of a chatbot on a given topic is time consuming, data intensive, and not scalable. For example, information is available to learners at universities through various web articles, FAQs, and documents. For students at those universities to search and find the necessary information is time consuming. While GOOGLE® and other search engines are gradually replacing card catalogs and human library assistants, it nevertheless is time consuming for students to search and find necessary information. A chatbot which combines the power of a search engine with the intuition and knowledge of a human assistant is an excellent alternative, however the classic training of a chatbot on a given topic is time consuming, data intensive, and not scalable.

SUMMARY

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one aspect, the disclosure provides a computer-implemented method. The method comprises receiving, at a processor executing a chatbot service, at least one of voice or text through a web or mobile device interface, resulting in a request; identifying, within the request, an intent; classifying the request as one of chit chat or a question, resulting in a classification; initiating, based on the classification, one of a chit chat service and a templatized answer microservice; receiving, from one of the chit chat service and the templatized answer microservice, a response text; and presenting, through the chatbot service, the response text.

According to one feature, the computer-implemented method further comprises detecting, at the processor executing the chatbot service, similarities between the request and a previously asked and answered question.

According to another feature, the previously asked and answered request is learned content stored in a knowledge base accessible by the chatbot service.

According to yet another feature, the previously asked and answered request is stored locally in cache to immediately provide the response text.

According to yet another feature, the templatized answer microservice identifies the response text based on context of the request.

According to another aspect, one or more non-transitory computer-readable media storing computer-executable instructions that upon execution cause one or more processors of a chatbot service is provided. The one or more processors perform acts comprising receiving at least one of voice or text through a web or mobile device interface, resulting in a request; identifying, within the request, an intent; classifying the request as one of chit chat or a question, resulting in a classification; initiating, based on the classification, one of a chit chat service and a templatized answer microservice; receiving, from one of the chit chat service and the templatized answer microservice, a response text; and presenting, through the chatbot service, the response text.

According to one feature, the one or more processors further performs the act of detecting, at the processor executing the chatbot service, similarities between the request and a previously asked and answered request.

According to another feature, the previously asked and answered request is learned content stored in a knowledge base accessible by the chatbot service.

According to yet another feature, the previously asked and answered request is stored locally in cache to immediately provide the response text.

According to yet another feature, the templatized answer microservice identifies the response text based on context of the request.

According to yet another aspect, a computing device of a chatbot service is provided. The computing device comprises an interface; and a processing circuit coupled to the interface. The processor is configured to receive at least one of voice or text through a web or mobile device interface, resulting in a request; identify, within the request, an intent; classify the request as one of chit chat or a question, resulting in a classification; initiate, based on the classification, one of a chit chat service and a templatized answer microservice; receive, from one of the chit chat service and the templatized answer microservice, a response text; and present, through the chatbot service, the response text.

According to one feature, the processor is further configured to detect similarities between the request and a previously asked and answered request.

According to yet another feature, the previously asked and answered request is learned content stored in a knowledge base accessible by the chatbot service.

According to yet another feature, the previously asked and answered request is stored locally in cache to immediately provide the response text.

According to yet another feature, the templatized answer microservice identifies the response text based on context of the request.

BRIEF DESCRIPTION OF THE DRAWINGS

Various features, nature, and advantages may become apparent from the detailed description set forth below when taken in conjunction with the drawings in which like reference characters identify correspondingly throughout.

DETAILED DESCRIPTION

Figure 1:
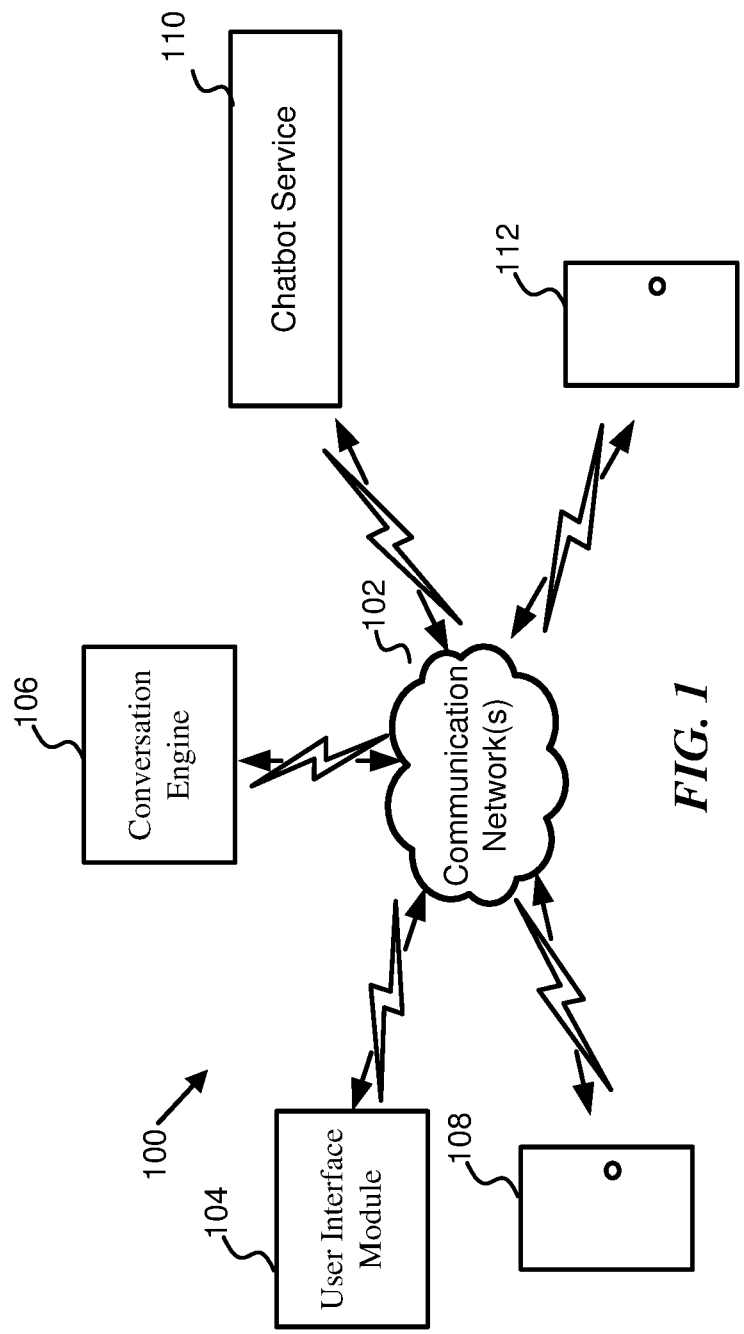
FIG. 1 is a conceptual diagram illustrating an operational environment within which embodiments of the systems and methods of the present disclosure may be found.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. As used herein, a reference to an element in the singular contemplates the reference to the element in the plural.

Overview

Disclosed herein are methods, systems, and non-transitory computer-readable storage media for training a chatbot, such that a user can ask a question and the bot can provide the answer using natural conversation. The previous approach was not scalable as there was lot of manual effort needed to create and update conversation flows in each topic to train the bot so that the bot can provide an answer on that topic. The solution disclosed herein is to create a conversation engine that can be trained automatically by feeding in articles, FAQs, or documents on specific topics. The conversation engine can provide answers to user's questions on the trained topic through a natural conversation. The conversation engine can provide web service endpoints (called conversation service endpoints) for training the engine on specific topics, and which can also be used during conversation with the user on that topic. When users ask a question on a topic to the chatbot, the chatbot can invoke conversation service endpoints, together with the intents, and the conversation service can provide the response via the chatbot. In this way the chatbot will be able to answer questions on a variety of topics without the effort of manually creating conversation flows for each of the topics.

The service area for the chatbot can be any knowledge area. For example, the chatbot can be directed to assisting users navigate a website, identify materials within a university system, provide account support, etc.

The solution disclosed herein is to create a conversation engine that can be trained automatically by feeding in articles, FAQs, and/or other documents on specific topics. The conversation engine can provide answers to questions on the trained topic through a natural conversation. The conversation engine can provide web service endpoints called "conversation service endpoints" for training the engine on specific topics and to have conversation with the user on that topic. When users ask a question on a topic to the chatbot, the bot can invoke conversation service endpoints, together with determined conversation intents and conversation service, to provide the response. In this way the chatbot can answer questions on a variety of topics without the effort of manually creating conversation flows for each of the topics.

The conversation engine of the present disclosure can be trained automatically for conversation using web articles, FAQs, and documents so that it can have a natural conversation with learners based on trained data. The conversation engine is available as a web service and can be used by any chatbot platform.

Several methods described herein may be implemented in hardware, such as a server, user interface or device, and conversation engine.

Terms

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "central processing unit", "processor", "processor circuit", and "processing circuit", and variations thereof, as used herein, are used interchangeably and include, but are not limited to, a general purpose processor, a digital signal processor (DSP), an application-specific integrated circuit (ASIC), a field programmable gate array (FPGA) or other programmable logic component, discrete gate or transistor logic, discrete hardware components, or any combination thereof designed to perform the functions described herein. A general-purpose processor may include a microprocessor, as well as any conventional processor, controller, microcontroller, or state machine. The processor may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processors are for illustration and other suitable configurations within the scope of the disclosure are also contemplated. Furthermore, the processor may be implemented as one or more processors, one or more controllers, and/or other structure configured to execute executable programming.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element.

The terms "user interface" and "user interface module" could embody or be implemented within a server, a personal computer, a mobile phone, a smart phone, a tablet, a portable computer, a machine, an entertainment device, or any other electronic device having circuitry.

There term "repository" is a location for stoarage while a "database" is a collection of usually organized information in a regular structure.

The various concepts presented throughout this disclosure may be implemented across a broad variety of telecommunication systems, network architectures, and communication standards.

Operational Environment

FIG. 1 is a conceptual diagram illustrating an operational environment within which embodiments of the systems and methods of the present disclosure may be found. That is, FIG. 1 illustrates an example architecture 100 for automating the training of a conversation engine that can empower a chatbot to have a natural conversation with an individual regarding topics not previously trained within which embodiments of the systems and methods of the present disclosure may be found. The system includes a communication network 102 that connects a user interface module 104, a conversation engine 106, a remote file system or server 108 and a Chatbot service 110. The user interface module 104, the conversation engine 106, remote file system or server 108 and the Chatbot service 112 are described in more detail below.

As described previously, the system 100 creates a conversation engine that can be trained automatically by feeding in articles, Frequently Asked Questions (FAQs), and/or other documents on specific topics. The conversation engine can provide answers to questions on the trained topic through a natural conversation.

In some embodiments, the system 100 may interact with a local data storage device 112 and/or the remote data storage device 108, or any combination of local and remote data storage devices and file systems.

A local file system (and/or remote file system) may control how data in the local data storage device 112 and/or remote data storage device 108 is stored and retrieved. In some embodiments, the structure and logic rules used to manage the groups of information stored as data in the local data storage device 112 and/or remote data storage device 108 may be referred to as a "file system" (e.g., local file system and/or remote file system). The local file system and/or remote file system may each have a different structure and logic, properties of speed, flexibility, security, size and more. In some embodiments, the structure and logic of the local file system and/or remote file system provide for improved speed and security over other known file systems. The local data storage device and/or remote data storage device may use the same or different media on which data may be stored. Examples of media include magnetic discs, magnetic tapes, optical discs, and electronic memory (such as flash memory).

Communication between any or all of the apparatus, devices, systems, functions, modules, and services and servers described herein may be made through one or more wired and/or wireless communication network(s) 102. Examples of communication network(s) 102 include a public switched telephone network (PSTN), a wide area network (WAN), a local area network (LAN), a TCP/IP data network such as the Internet, and a wireless network such as the 3G, 4G, LTE, and 5G networks promulgated by the Third Generation Partnership Project (3GPP). The communication networks(s) 102 may be any one or combination of two or more communication networks such as, but not limited to, the just-mentioned communication networks.

Figure 2:
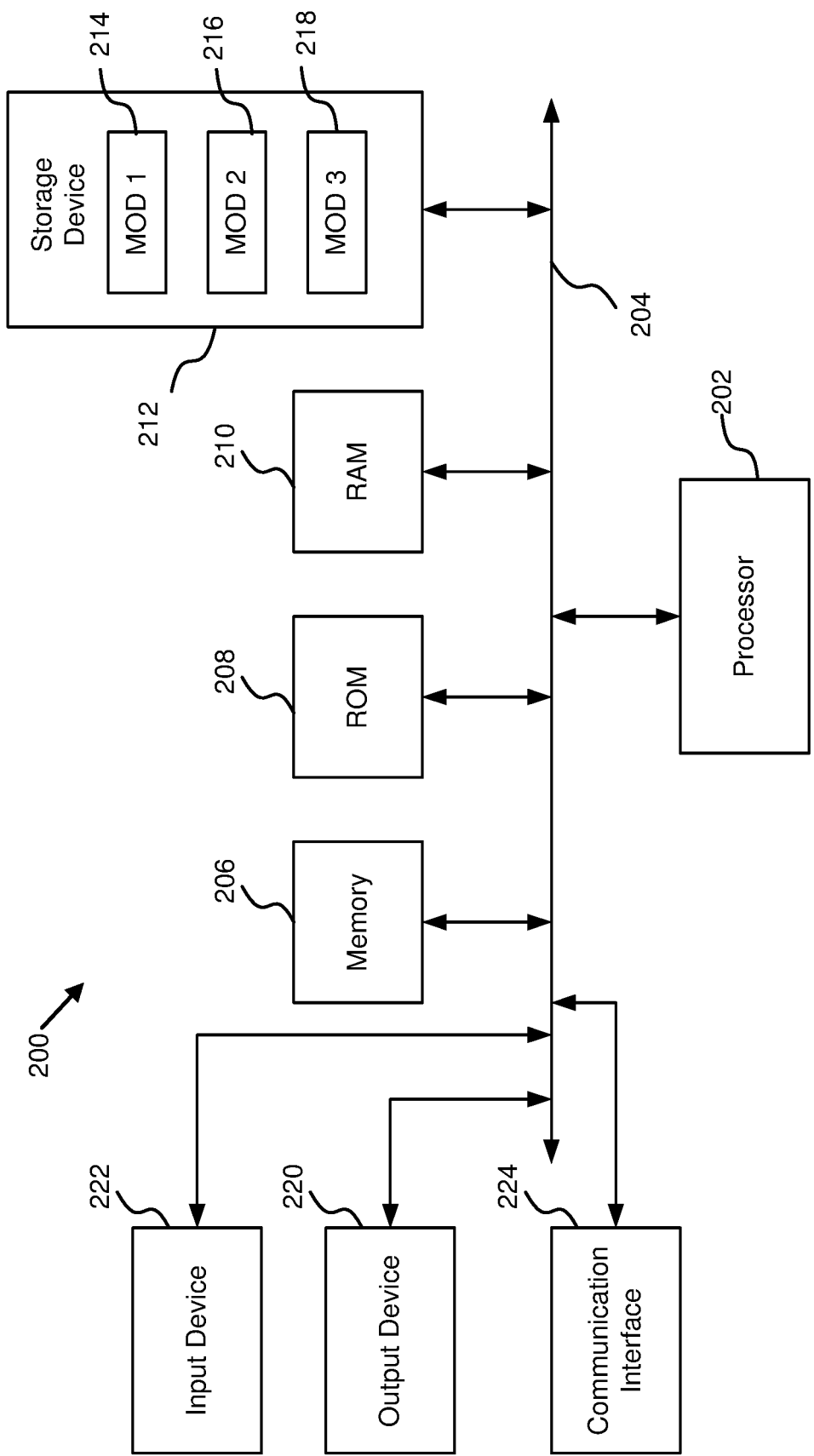
FIG. 2 is a block diagram illustrating an example computer system.

FIG. 2 is a block diagram illustrating an example computer system. The exemplary system includes a general-purpose computing device 200, including a processing unit (CPU or processor) 202 and a system bus 204 that couples various system components including the system memory 206 such as read-only memory (ROM) 208 and random-access memory (RAM) 210 to the processor 202. The system 200 can include a cache of high-speed memory connected directly with, in close proximity to, or integrated as part of the processor 202. The system 200 copies data from the memory 206 and/or the storage device 212 to the cache for quick access by the processor 202. In this way, the cache provides a performance boost that avoids processor 202 delays while waiting for data. These and other modules can control or be configured to control the processor 202 to perform various actions. Other system memory 430 may be available for use as well. The memory 206 can include multiple different types of memory with different performance characteristics. It can be appreciated that the disclosure may operate on a computing device 200 with more than one processor 202 or on a group or cluster of computing devices networked together to provide greater processing capability. The processor 202 can include any general-purpose processor and a hardware module or software module, such as module 1 214, module 2 216, and module 3 218 stored in storage device 212, configured to control the processor 202 as well as a special-purpose processor where software instructions are incorporated into the actual processor design. The processor 202 may essentially be a completely self-contained computing system, containing multiple cores or processors, a bus, memory controller, cache, etc. A multi-core processor may be symmetric or asymmetric.

The system bus 204 may be any of several types of bus structures including a memory bus or memory controller, a peripheral bus, and a local bus using any of a variety of bus architectures. A basic input/output (BIOS) stored in ROM 208 or the like, may provide the basic routine that helps to transfer information between elements within the computing device 200, such as during start-up. The computing device 200 further includes storage devices 212 such as a hard disk drive, a magnetic disk drive, an optical disk drive, tape drive or the like. The storage device 212 can include software modules 214, 216, 218 for controlling the processor 202. Other hardware or software modules are contemplated. The storage device 212 is connected to the system bus 204 by a drive interface. The drives and the associated computer-readable storage media provide nonvolatile storage of computer-readable instructions, data structures, program modules and other data for the computing device 200. In one aspect, a hardware module that performs a particular function includes the software component stored in a tangible computer readable storage medium in connection with the necessary hardware components, such as the processor 202, bus 204, output device (such as a display) 220, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 200 is a small, handheld computing device, a desktop computer, or a computer server.

Although the exemplary embodiment described herein employs the storage device 212, other types of computer-readable media which can store data that are accessible by a computer, such as magnetic cassettes, flash memory cards, digital versatile disks, cartridges, random access memories (RAMs) 210, and read-only memory (ROM) 208, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 200, an input device 222 represents any number of input mechanisms, such as a microphone for speech, a touch-sensitive screen for gesture or graphical input, keyboard, mouse, motion input, speech and so forth. An output device 220 can also be one or more of a number of output mechanisms known to those of skill in the art. In some instances, multimodal systems enable a user to provide multiple types of input to communicate with the computing device 200. The communications interface 224 generally governs and manages the user input and system output. There is no restriction on operating on any particular hardware arrangement and therefore the basic features here may easily be substituted for improved hardware or firmware arrangements as they are developed.

Conversation Engine

Figure 3:
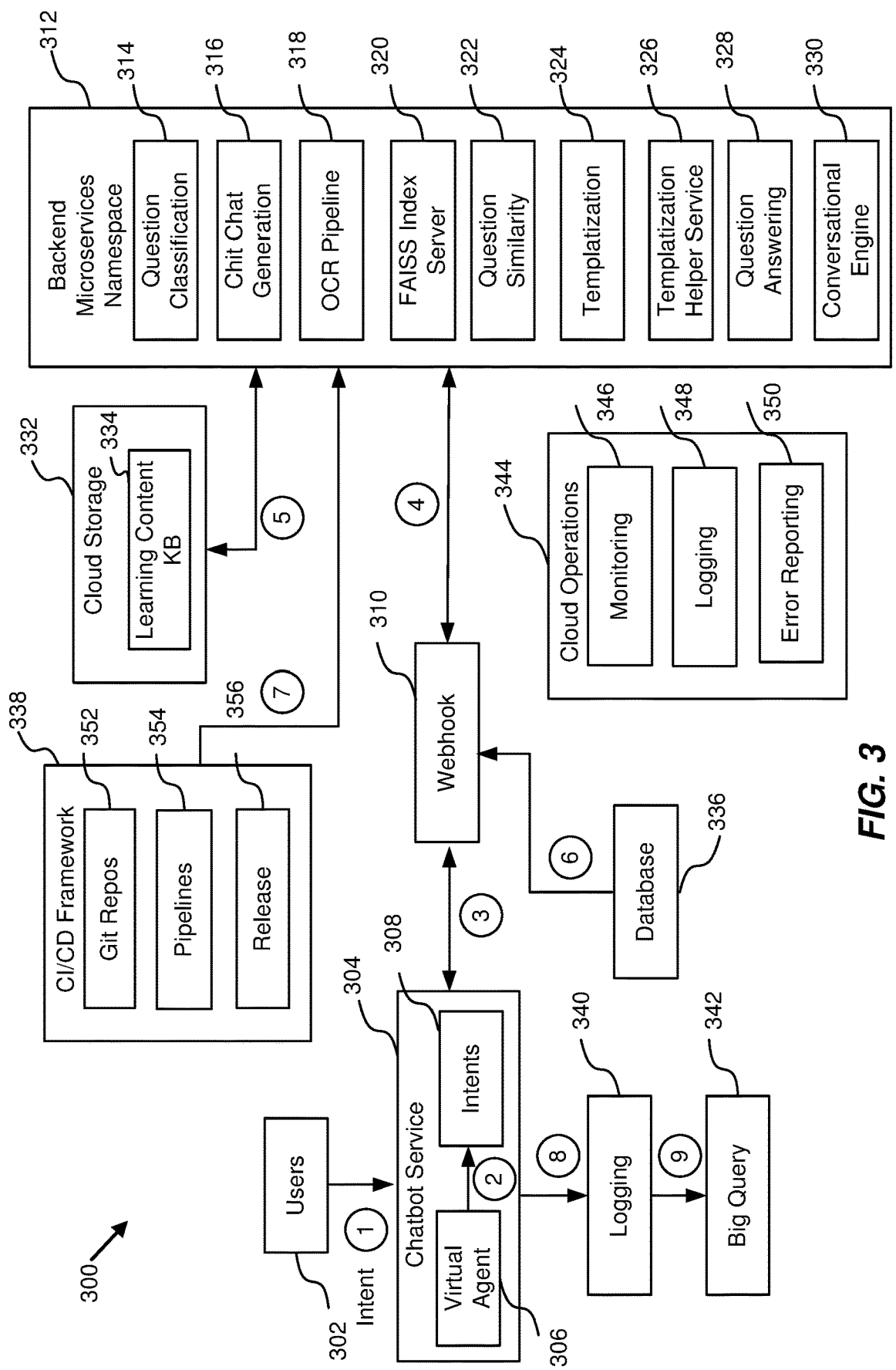
FIG. 3 is a block diagram illustrating an example architecture of a conversation engine of the present disclosure.

FIG. 3 illustrates an example architecture of the conversation engine of the present disclosure. The conversational engine is available for consumption as web services which may be available in Representative State Transfer (REST)/JavaScript Object Notation (JSON) format. The services may be available as each individual functionality and may be hosted entirely on Google Kubernetes Engine.

The conversation engine is trained automatically by feeding in articles, FAQs, or documents on specific topics and can provide answers to a user's questions on the trained topic through a natural conversation. The conversation engine can provide web service endpoints called conversation service for training the engine on specific topics and to have conversation with the user on that topic. When users ask a question on a topic to a chatbot, the chatbot can invoke conversation service endpoints with the intents and the conversation service can provide the response allowing the chatbot to answer questions on a variety of topics without the effort of manually creating conversation flows for each of the topics.

As illustrated in FIG. 3, the conversation engine 300 may comprise a chatbot service 304, webhook 310, database 336, cloud operations 344, backend microservices namespace 312, cloud storage 332, continuous integration (CI)/continuous delivery (CD) framework 338, logging service 340, and a big query configured to analyze data 342 and will be described in more detail below.

The conversation service architecture 300 may operate follow the below steps during operation:

1. First, a user 302 may have conversations and communicate with the chatbot service 304 through voice or text via a web or user interface and ask a question. The chatbot service 304 may include a chatbot agent 306 and one or more intents 308 which are the questions or goals of the user.
2. The chatbot agent 306 may then convert the voice to text and sends the one or more intents 308 to the webhook or backend web service 310. Once the response text is available from the webhook or backend web service 310, the response may be presented to the user based in the appropriate channel. That is, the response is provided to the user in the same communication method in which the question was asked, such as in a chat board or a text, for example.
3. The chatbot agent 306 may then send the intents to the webhook or backend web service 310 to interact with the conversation engine for conversing with the user. The webhook or backend web service 310 receives the request intent 308 from the chatbot service 304 and orchestrates a communication with the backend micro services namespace 312 to provide a response to the user's question.
4. The request may then be sent to the backend microservices namespace 312 which has a collection of available microservices that may be utilized. The question may then be classified using the classification microservice 314 to determine if the request is chit chat or an actual question. That is, based on the complexity of the question being asked, the backend microservices namespace 312 determines which available microservices are utilized to answer the question. If the request is just chitchat, the backend microservices namespace 312, using a chit chat generation microservice 316, generates the appropriate response and provides the response to the user. If the request is a question and the question has already been well documented in the repository, the response may be provided directly. A FAQ-question similarity microservice 322 may be utilized to identify related questions for which there is a documented answer to help the user. If the question is not well documented in a repository, the question will go through the templatized answer microservice for identifying the correct answer based on the context of the question. From this the response is generated and provided to the user.
5. The internal microservices of the backend microservices namespace 312 may then use learned content from various documents as a knowledge base (KB) 334 to prepare the response. The learned content in the knowledge base 334 may be stored in cloud storage 332 and is accessible to the backend microservices namespace 312. Comma-separated values (CSV) files with learned content files are converted into a knowledge base and stored in cloud storage for use in preparing the response.
6. Entry web services 310 uses the configuration in a NoSQL database 336 to orchestrate and prepare the response.
7. The Continuous Integration (CI)/Continuous Delivery (CD) framework 338 builds, tests, and deploys all services through an automatic pipeline.
8. All user interactions are then logged using a logging service 340.
9. Finally, the logging service 340 writes the log into a log table for generating business analytics. The big query 342 is a data warehouse where all interactions with the users are logged. The interactions may include, but are not limited to, communications with the chatbot service, webhook, and backend microservices namespace.

The cloud operations 344 can be used if a user reports an error. The system monitors 346 for error reporting and logs 348 any reported errors. If there is an error, an email alert may be sent 350. This allows the support team of the system to proactively correct any errors. These may be standard operations that are available in the Google Cloud platform, for example.

The continuous integration (CI)/continuous delivery (CD) framework 338, as is known in the art, may include a git repository 352, pipelines 354, and release 356. The repository 352 may be used to store data and the pipelines 354 may be automated for making changes, and the release 356 deploys the changes.

The system disclosed herein can, for example, be implemented using a container orchestration platform, such as Kubernetes, which enables the operation of an elastic web server framework for cloud applications. Within such a platform, there can be pods (the smallest deployable units of computing that the system can create and manage) which can be activated, exchanged, or otherwise managed by clustering services which manage one or more pods.

The microservices namespace contains individual web service endpoints that can be accessed from external networks with the help of ingress. Each service can be initially a docker image which is configured within a pod within the namespace. Each service is orchestrated in different pods which provide different functionalities. Each pod is then exposed within the cluster using node port services. Node port services act as a link for communicating between different pods or ingress within the cluster.

The original basis for the microservices is from open-source libraries and the present disclosure builds onto to these libraries over time using a wrapper function as is known in the art.

Microservice Namespace

The microservice namespace may be divided into individual services. As shown in FIG. 3, these individual services may include, but are not limited to, question classification 314, chit chat generation 316, OCR pipeline 318, FAISS index server 320, question similarity 322, templatization 324, templatization helper services 326, question answering 328, and conversational engine 330, explained in more detail below.

The conversation service serves as an interface between the virtual agent (chatbot) and all other microservices. The endpoint of this microservice is used as a fulfillment URL in the virtual agent webhooks. The request from the virtual agent is parsed here and, based on the intent triggered in the virtual agent, it is decided which microservice has to be called. After the completion of the desired operation, other microservices may send a response here and the conversational engine responds back to the virtual agent.

The conversation service can be categorized into four major microservices, executed across a cloud system using a container orchestration platform, such as Kubernetes, with the different services being executed as separate pods within a cluster:

1. FAQ-Question Similarity Microservice—This service takes the user's questions and provides FAQs similar to the user's query. This service can also get random FAQs.
2. Templatized Answer Microservice—This service takes a learner's query and intent name and generates natural responses based on some conditions.
3. AllenNLP Coref-Resolution Microservice—This service performs coreference resolution on a user's previous question and current question.
4. Question Classification Microservice—This service classifies the user's input text as a statement or question.

These microservices are described in further detail below.

Based on the results of FAQ-Question Similarity Microservice (Question Similarity Score) and Question Classification Microservice (Question Classification Score), the conversation engine may then decide the type of response to be generated from the Templatized Answer microservice. The following table describes the cases and types of responses that may be generated.

TABLE 1

| Question Similarity Score | Question Classification Score | Result |
| --- | --- | --- |
| High | High | Answer to the FAQ |
| High | Medium | Answer to the FAQ |
| High | Low | Chitchat |
| Medium | High | Rephrase/Don't Know |
| Medium | Medium | Rephrase/Don't Know |
| Medium | Low | Chitchat |
| Low | High | Chitchat |
| Low | Medium | Chitchat |
| Low | Low | Chitchat |

For Question Similarity Score
    High: >0.85, Medium: 0.75 to 0.85 and Low: <0.75
For Question Classification Score
    High: >0.7, Medium: 0.5 to 0.7, and Low: <0.5
FAISS-Similarity Microservice Regarding the FAISS-Similarity Microservice, its functionality is to obtain the most similar FAQ from a FAISS database for a user query. This microservice works convert a user query into a vector by passing it through a transformer encoder and calls the FAISS-Database Microservice to find the most similar vector for the input query vector.

Figure 4:
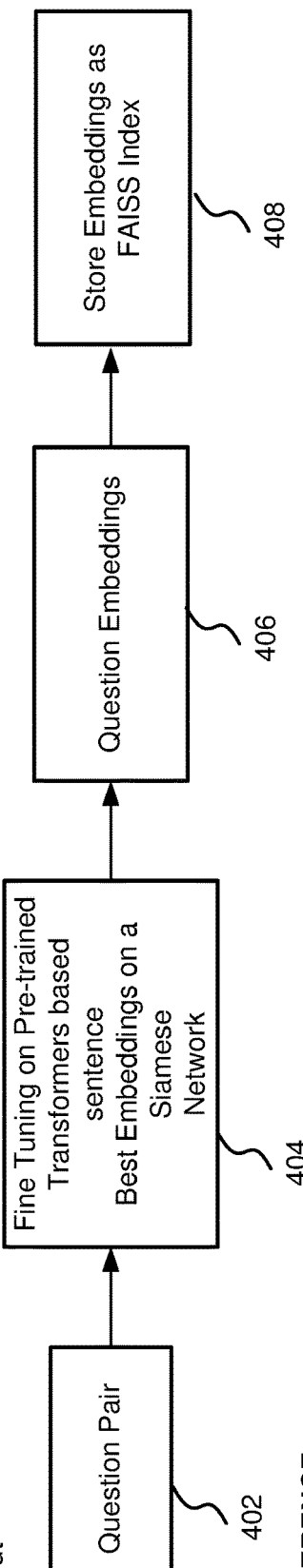
FIG. 4 is a flow diagram illustrating an example of fundamental approaches of solving neural question similarity using deep learning.
Figure 4:
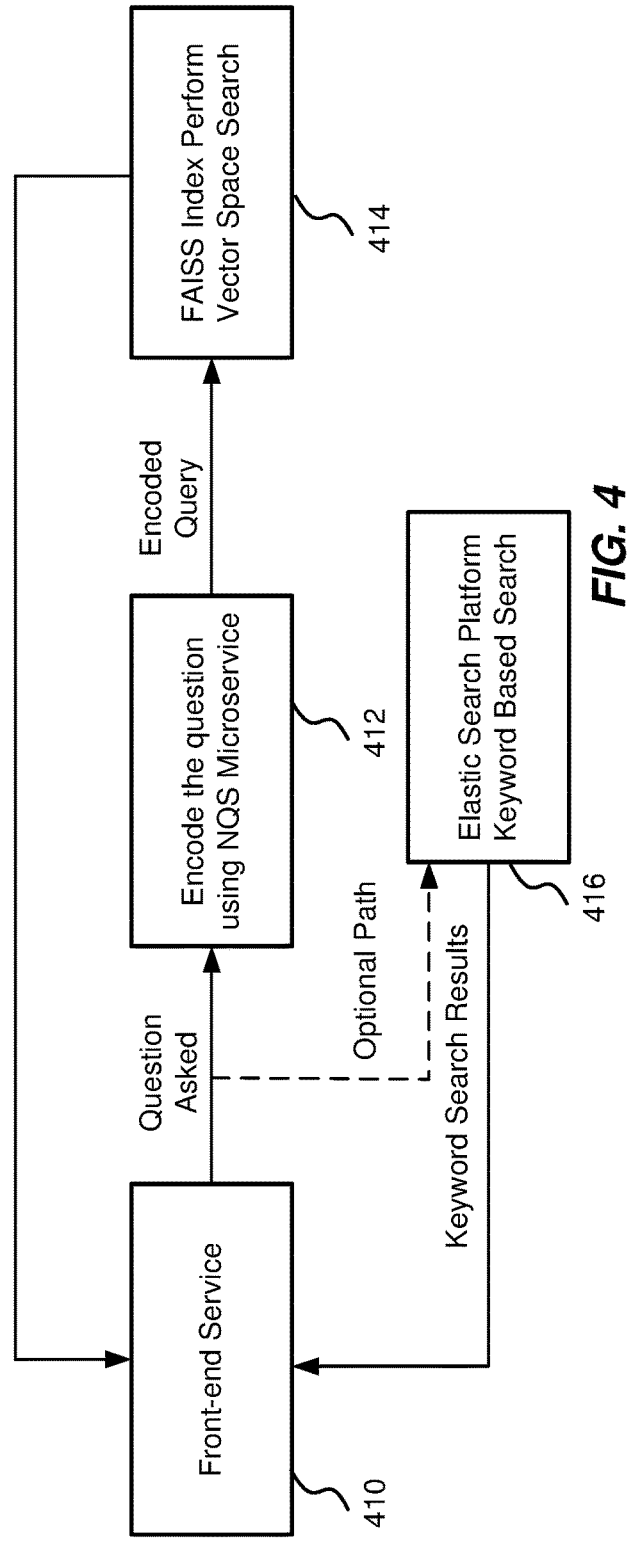

FIG. 4 is a flow diagram 400 illustrating an example of fundamental approaches of solving neural question similarity (NQS) using deep learning. That is, the system receives a question as input and provides the most similar questions as output. Two phases are utilized for deep learning, a training phase and an inference phase. In the training phase, a developer feeds their model a curated dataset so that it can "learn" everything it needs to about the type of data it will analyze. Then, in the inference phase, the model can make predictions based on live data to produce actionable results.

In the training phase, the task is to build an artificial intelligence system that can take a question as input and give the most similar questions as output to train the chatbot. There may be questions and answers that have already been used from a CSU file to train the model. In this phase, a search is conducted to determine if the question being asked has similarities (i.e., similar context or meaning) to a question that has already been asked and answered and is stored in the repository 402. That is, the system detects if there are similarities between the pair of questions, the questions being asked and a question that has already been answered so that an answer can be provided to the current question based on an answer provided to a previous question.

Next, fine tuning on pre-trained transformers based sentence best embeddings on a Siamese Network (i.e., machine learning models that can identify the context or meaning of the text sent by the user) of the learning models occurs based onto provide a quick response to the question 404. As the system is trained with these new questions, the Facebook AI Similarity Search (FAISS) index needs to be updated with these embeddings (i.e., new questions that are trained) 406.

The FAISS index database is utilized to provide a quick response to the question being asked as it stores embedded questions from multimedia documents that are similar to each other 408.

In the inference phase, a front-end service 410 encodes the question asked by the user using NQS microservice 412. A FAISS index performs a vector space search for the encoded query to find an answer 414. The semantic search results may then be provided to the front-end service 410. Alternatively, the front-end service 410 may send the question asked to an elastic search platform for a keyword based search to identify any questions with similar meaning 416. The keyword search results are then provided to the front-end service 410.

FAISS-Database Microservice

Regarding the FAISS-Database Microservice, FAISS is a library for efficient similarity search and clustering of dense vectors. It contains algorithms that search in sets of vectors of any size, up to ones that possibly do not fit in RAM. It assumes that the instances are represented as vectors and are identified by an integer and that the vectors can be compared with L2 (Euclidean) distances or dot products. Vectors that are similar to a query vector are those that have the lowest L2 distance or the highest dot product with the query vector. It also supports cosine similarity, since this is a dot product on normalized vectors.

The FAISS-Database microservice has endpoints to connect to the FAISS index server 320 to create a database of vectors and during inference find the most similar vector for the given user vector in the most efficient way using a two-step approach. The first step is to find the most similar cluster for the input vector, and the second step is to find the most similar vector in the cluster(s) for the input vector.

Templatized Answer Microservice

Regarding the Templatized Answer Microservice, this microservice is used to provide a natural response corresponding to each intent. This microservices may perform the following functions:
  Given an answer generated from the Conversation Engine, it randomly selects and performs summarization, paraphrasing, or returns the generated answer itself. Further to add variations in response, it adds some random prefix and suffix making the responses more conversational. This action is performed only when the "perform" parameter is "faq_sim".
  If the Conversation Engine sends the request with a "rephrase" parameter as True, a response is generated asking the user to rephrase the question. This action is performed using a rule-based generator.
  If the perform parameter is "chit_chat", the templatized microservice calls chitchat microservice and performs post-processing on the response and returns it. To keep track of chitchat, there is a chitchat counter maintained by the conversational engine. When the chitchat counter exceeds the chitchat threshold, a prompt to get the user back to the topic is added to the response.
  For the intents—There are some pre-defined sets of responses in the configuration, such as know more, satisfied and not satisfied. When the request contains a value for "intent" parameter then it is matched with these predefined intent names and the corresponding response is returned to the conversational engine.
  For non-chit chat responses, the response is wrapped in a ssml tag before returning it to the conversational engine.

Templatization Helper Microservice

Regarding the Templatization Helper Microservice, this microservice is used to perform summarization, paraphrasing, and don't know response generation. This microservice is called from templatized answer microservice to perform a particular action as selected. The following are the endpoints in this microservice:
  An endpoint to generate an abstractive summary of the given text using transformers encoder-decoder model BART.
  An endpoint to generate an abstractive paraphrase using the Transformer encoder-decoder model Pegasus. Given a user query, this endpoint can generate a "don't know" response by using a sequence-to-sequence T-5 model for the query when the model is not confident about the answer.

AllenNLP Coref-Resolution Microservice

Regarding the AllenNLP Coref-Resolution Microservice, this is a microservice that performs coreference resolution on a user's previous question and current question. Coreference resolution is the task of finding all expressions that refer to the same entity in a text.

For example, consider the following text: "Winona Sample (1917-2008)", another important role model and national leader, was involved with Head Start from its beginning. Born on the Redlake Chippewa reservation in Minnesota, Sample had to go away to school like many Indian children. She became director of a large Head Start program and eventually head of Indian Health Services for the State of California. She, too, served on the NAEYC Board. In her own words, "The highlight of my life was being selected as the vice chair of the International Year of the Child (1979-1980)" (Neugebauer, 1995, p. 57)."

The system can resolve this text to read: "Winona Sample$_1$ (1917-2008)", another important role model and national leader, was involved with Head Start$_2$ from Head Start$_2$ beginning. Born on the Redlake Chippewa reservation in Minnesota, Winona Sample$_1$ had to go away to school like many Indian children. Winona Sample$_1$ became director of a large Head Start$_2$ program and eventually head of Indian Health Services for the State of California. Winona Sample$_1$, too, served on the NAEYC Board. In Winona Sample$_1$'s own words, "The highlight of Winona Sample$_1$'s life was being selected as the vice chair of the International Year of the Child (1979-1980)" (Neugebauer, 1995, p. 57)," thereby identifying common entities and marking those entities with (in this example) footnote/endnote markings.

Question Classification Microservice

Regarding the Question Classification Microservice, during a conversation, a user may ask a question expecting the chatbot to assist or may send a statement that could be feedback to the earlier response from the chatbot or even an expression reflecting user thoughts. This microservice takes every user's input and returns the probability of the input to be a question. Using this score, the user query is redirected to either FAQ-question similarity or chitchat microservices. The approach chosen can, for example, be a Zero Shot Classification using transformers BART MNLI model with question and statement as two labels.

Haystack QnA Microservice

Figure 5:
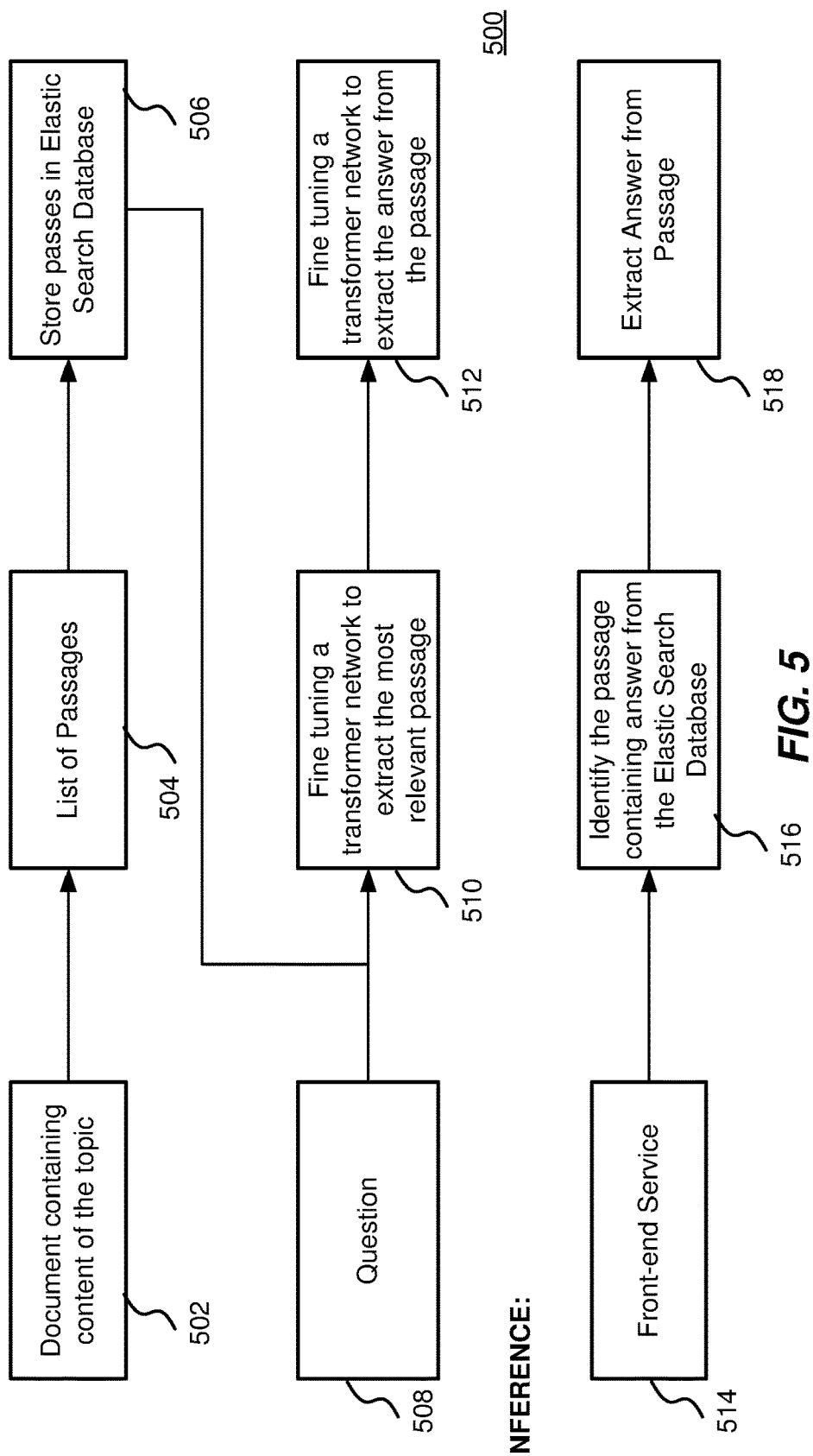
FIG. 5 is a flow diagram illustrating an example of training and inference of a neural question answering microservice of the present disclosure.

FIG. 5 is a flow diagram 500 illustrating an example of training and inference of a neural question answering microservice of the present disclosure. In the training phase, the task is to build an artificial intelligence system that can take a question as input and extract the most relevant answer from a set of documents. In other words, the question and answer has already been stored in the database and identifying a similar question is not needed.

As shown, the user asks a question 508, but as part of the training, the question is already available in a document containing content of the topic of the question 502. From the document a list of passages is identified that may provide the answer to the question 504. The list of passages may then be searched in an elastic search database 506. The search is conducted to find a file that contains a passage that already provides an explanation to the question. To improve the performance, a cache is utilized so the system doesn't have to search the knowledge base (as described previously) to obtain the data and the cache provides the response immediately. The elastic database is used to improve the performance of the response.

From this information, the neural question answering microservice fine tunes a transformer network to extract the most relevant passage 510 and then fine tunes a transformer network to extract the answer from the passage 512.

In the inference phase, a front-end service 514 identifies the passage containing the answer from the elastic search database 516 and extracts the answer from the passage 518.

Question and Answer (QnA) Microservice

Regarding the Question and Answer (QnA) Microservice, this microservice can be used to answer a question by referring to a set of documents. According to one example, the QnA microservice has three components and can be built using Haystack, an open-source Neural QnA framework.

The first component is document store which is a database that stores and hosts all documents and corresponding embeddings with respective indices. The database can be searched using an elastic search. The second component is retriever. The retriever is used to search the entire database and filtertop_k documents that are similar to the user's question and return them to the reader. The second component is reader which is a transformer based Electra large model fine-tuned on Squad Question Answering dataset (V2).

OCR Pipeline Microservice

Regarding the OCR Pipeline Microservice, this microservice is responsible for extracting content from a PDF file stored in the GCS bucket and saving a new text file in the bucket itself. It is capable of doing OCR of a single as well as all files stored in that particular folder whose path is passed in the request.

The OCR Pipeline Microservice can use, for example, the GOOGLE Vision API internally to perform the expected task. This microservice is not used at runtime, i.e., when the user interacts with the virtual agent. Instead, other machine learning (ML) microservices use the outcome of this microservice for responding to user queries. Thus, this microservice may run as a pre-requisites of other ML microservices.

The working of this microservice can be summarized as:
Takes GCS path of file from request body.
Calls Cloud Vision API internally, passing source file path and destination path (where results of OCR will be stored as JSON files).
Merges all JSON files and creates a text file of merged contents and saves it in the GCS bucket (location set in config file) itself.
Generates signed URL (public access point) for the newly created text file and Returns it.

The response can be configured to be either synchronous or asynchronous. In a synchronous response, when the user runs the OCR-pipeline the user has to wait till the backend performs all desired tasks and returns an access point to the newly generated file. In an asynchronous response, when the user schedules an OCR job for the file and doesn't wait for the actual output, instead it receives an operation Id corresponding to the job that this microservices is running in the background asynchronously. Although users can check the progress of their job at any point of time using that operation ID.

ElasticSearch Serving Microservice

Regarding the ElasticSearch Serving Microservice, Elasticsearch is a distributed, free and open search and analytics engine for all types of data, including textual, numerical, geospatial, structured, and unstructured. This microservice hosts ElasticSearch Database. All the database operations can be done from Haystack QnA services.

Chitchat Microservice

Regarding the Chitchat Microservice, the functionality of this service is to answer users on open domain chit chat questions. This service is built using the framework ParlAI, an open-source software platform for dialog research implemented in Python. This service is built with a custom world, agent pre-trained and fine-tuned on Daily Dialog dataset.

For software/business method type claims, use this language: One exemplary, nonlimiting, practical application to the technical problem noted above is . . . .

Conclusion

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. The terms "at least one" and "one or more" may be used interchangeably herein.

Within the present disclosure, use of the construct "A and/or B" may mean "A or B or A and B" and may alternatively be expressed as "A, B, or a combination thereof" or "A, B, or both". Within the present disclosure, use of the construct "A, B, and/or C" may mean "A or B or C, or any combination thereof" and may alternatively be expressed as "A, B, C, or any combination thereof".

One or more of the components, steps, features and/or functions illustrated herein may be rearranged and/or combined into a single component, step, feature, or function or embodied in several components, steps, or functions. Additional elements, components, steps, and/or functions may also be added without departing from novel features disclosed herein. The apparatus, devices, and/or components illustrated herein may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of:" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. A computer-implemented method comprising:
   at a server having one or more processors and memory storing one or more programs for execution by the one or more processors so as to perform the method:
   communicating electronically with a chatbot service to receive a digital request from a user interface;
   identifying, by the chatbot service, an intent from the digital request;
   transmitting, by the chatbot service, the intent to a webhook for interacting with a conversation engine for conversing with a user;
   receiving, at the webhook, the intent from the chatbot service and orchestrating a communication with a backend microservices namespace to provide a response to the intent; and
   determining, by the backend microservices namespace, the intent as one of a chit chat or a question; and
   wherein the orchestrated communication with the backend microservices namespace comprises:
   invoking at least one AI-based microservice that performs real-time processing of the digital request by transforming the digital request into a vector representation using a transformer encoder;
   comparing the vector to a set of previously embedded vectors stored in a Facebook AI Similarity Search (FAISS) based similarity search database; and
   returning a contextually relevant response to the chatbot service for presentation to the user.

2. The method of claim 1, wherein the digital request is a voice message or a text transmitted using a web or mobile device interface.

3. The method of claim 1, further comprising:
   generating, by the backend microservices namespace, a response to the intent using a chit chat generation microservice if the intent is chit chat; and
   transmitting the response to the user.

4. The method of claim 1, further comprising:
   generating, by the backend microservices namespace, a response to the intent directly to the user if the intent is a question; and
   transmitting the response to the user; and
   wherein the response is generated from a repository of well documented responses to questions.

5. The method of claim 1, further comprising detecting, using a frequently asked question (FAQ) similarity microservice of the chatbot service, similarities between the intent and a previously asked and answered intent.

6. The method of claim 5, wherein the previously asked and answered request is learned content stored in a knowledge base accessible by the chatbot service.

7. The method of claim 5, wherein the previously asked and answered request is stored locally in cache to immediately provide the response to the user in the form of a text.

8. The method of claim 5, wherein the frequently asked question (FAQ) similarity microservice of the chatbot service identifies the response to the user based on a context of the intent.

9. The method of claim 1, wherein the conversation engine is trained automatically trained by sending articles, frequently asked questions (FAQs), or documents on specific topics to the conversation engine.

10. The method of claim 1, further comprising:
    converting the digital request, using a frequently asked question (FAQ) similarity microservice, into a vector by transmitting the digital request through a transformer encoder; and
    determining a most similar vector using an AI Similarity Search Database Microservice to find a most similar vector.

11. The method of claim 10, further comprising performing a vector space search for the encoded digital request to find an answer to the intent.

12. A computer-implemented method comprising:
at a server having one or more processors and memory storing one or more programs for execution by the one or more processors so as to perform the method:
communicating electronically with a chatbot service to receive a digital request from a user interface;
identifying, by the chatbot service, an intent from the digital request;
transmitting, by the chatbot service, the intent to a webhook for interacting with a conversation engine for conversing with a user;
receiving, at the webhook, the intent from the chatbot service and orchestrating a communication with a backend microservices namespace to provide a response to the intent;
determining, by the backend microservices namespace, the intent as one of a chit chat or a question;
converting the digital request, using a frequently asked question (FAQ) similarity microservice, into a vector by transmitting the digital request through a transformer encoder;
determining a most similar vector using an AI Similarity Search Database Microservice to find a most similar vector;
performing a vector space search for the encoded digital request to find an answer to the intent; and
wherein the vector space search and similarity matching are performed using a Facebook AI Similarity Search (FAISS) based similarity database and transformer-based encoder to identify and return a contextually relevant response in real-time.

13. The method of claim 12, wherein the digital request is a voice message or a text transmitted using a web or mobile device interface.

14. The method of claim 12, further comprising:
generating, by the backend microservices namespace, a response to the intent using a chit chat generation microservice if the intent is chit chat; and
transmitting the response to the user.

15. The method of claim 12, further comprising:
generating, by the backend microservices namespace, a response to the intent directly to the user if the intent is a question; and
transmitting the response to the user; and
wherein the response is generated from a repository of well documented responses to questions.

* * * * *